US012592397B2

(12) United States Patent
Sung et al.

(10) Patent No.: US 12,592,397 B2
(45) Date of Patent: Mar. 31, 2026

(54) TUBULAR POLYMER ELECTROLYTE MEMBRANE FUEL CELL STACK

(71) Applicants: Seoul National University R&DB Foundation, Seoul (KR); Institute for Basic Science, Daejeon (KR); Kangwon University-Industry Cooperation Foundation, Chuncheon-si (KR)

(72) Inventors: Yung-Eun Sung, Uiwang-si (KR); Yong-Hun Cho, Gunpo-si (KR); Wonchan Hwang, Seoul (KR)

(73) Assignees: Seoul National University R&DB Foundation, Seoul (KR); Institute for Basic Science, Daejeon (KR); Kangwon University-Industry Cooperation Foundation, Chuncheon-si (KR)

( * ) Notice: Subject to any disclaimer, the term of this patent is extended or adjusted under 35 U.S.C. 154(b) by 518 days.

(21) Appl. No.: 18/063,260

(22) Filed: Dec. 8, 2022

(65) Prior Publication Data

US 2023/0106823 A1 Apr. 6, 2023

Related U.S. Application Data

(63) Continuation of application No. PCT/KR2022/011792, filed on Aug. 8, 2022.

(30) Foreign Application Priority Data

Aug. 13, 2021 (KR) ........................ 10-2021-0107586

(51) Int. Cl.
*H01M 8/0252* (2016.01)
*H01M 8/00* (2016.01)
(Continued)

(52) U.S. Cl.
CPC ......... *H01M 8/0252* (2013.01); *H01M 8/004* (2013.01); *H01M 8/0232* (2013.01);
(Continued)

(58) Field of Classification Search
None
See application file for complete search history.

(56) References Cited

U.S. PATENT DOCUMENTS

2017/0179498 A1 6/2017 Shoji et al.

FOREIGN PATENT DOCUMENTS

CN 1805200 A 7/2006
JP 2003-317790 A 11/2003
(Continued)

OTHER PUBLICATIONS

Machine translation of JP 2003-317790, Nov. 7, 2023.*
Machine translation of KR 10-1366715 B1, Feb. 25, 2014.*

*Primary Examiner* — Jonathan Crepeau
(74) *Attorney, Agent, or Firm* — Knobbe, Martens, Olson & Bear, LLP

(57) ABSTRACT

A fuel cell stack including a plurality of fuel cell units having a truncated cone shape and connected in series with each other is proposed. The series connection of the fuel cell units may be made such that a relatively small outer diameter portion of one of the fuel cell units is inserted into a relatively large outer diameter portion of another fuel cell unit adjacent to the one fuel cell unit.

9 Claims, 8 Drawing Sheets

(51) Int. Cl.

| | | |
|---|---|---|
| *H01M 8/0232* | (2016.01) | |
| *H01M 8/0234* | (2016.01) | |
| *H01M 8/0254* | (2016.01) | |
| *H01M 8/10* | (2016.01) | |
| *H01M 8/1004* | (2016.01) | |
| *H01M 8/1018* | (2016.01) | |
| *H01M 8/1069* | (2016.01) | |
| *H01M 8/2465* | (2016.01) | |

(52) U.S. Cl.
CPC ....... *H01M 8/0234* (2013.01); *H01M 8/0254* (2013.01); *H01M 8/1004* (2013.01); *H01M 8/1018* (2013.01); *H01M 8/1069* (2013.01); *H01M 8/2465* (2013.01); *H01M 2008/1095* (2013.01)

(56) References Cited

FOREIGN PATENT DOCUMENTS

| | | | |
|---|---|---|---|
| JP | 2009-117101 | A | 5/2009 |
| KR | 10-1366715 | B1 | 2/2014 |
| KR | 10-2014-0036372 | A | 3/2014 |
| KR | 10-1707063 | B1 | 2/2017 |

* cited by examiner

100

110,150

TUBULAR POLYMER ELECTROLYTE MEMBRANE FUEL CELL STACK

CROSS-REFERENCE TO RELATED APPLICATIONS

This application is a continuation application, and claims the benefit under 35 U.S.C. § 120 and § 365 of PCT Application No. PCT/KR2022/011792, filed on Aug. 8, 2022, which claims priority to Korean Application No. 10-2021-0107586 filed on Aug. 13, 2021, the contents of each of which are hereby incorporated by reference in its entirety.

BACKGROUND

Technical Field

The present disclosure relates to a tubular polymer electrolyte membrane fuel cell stack.

Description of Related Technology

An existing fuel cell is composed of an end plate, a bipolar plate, a gasket, and a membrane electrode assembly (MEA) which is sealed to prevent leakage of reaction gases and water ($H_2O$).

SUMMARY

One aspect is a fuel cell stack with a tubular polymer electrolyte membrane having a corrugated tube shape and being capable of 3D motion.

Another aspect is a tubular polymer electrolyte membrane fuel cell stack including a plurality of fuel cell units having a truncated cone shape and connected in series with each other. The fuel cell units are connected in series with each other in a manner that a relatively small outer diameter portion of each of the fuel cell units is inserted into a relatively large outer diameter portion of an adjacent fuel cell unit.

The fuel cell unit according to the present disclosure may include: a current collector layer having a truncated cone shape; an anode diffusion layer wound around the current collector to absorb a gas or liquid to be supplied to an anode electrode; a membrane electrode assembly layer wound around the anode diffusion layer, composed of an electrolyte membrane, an anode electrode, and a cathode electrode, and configured such that a gas or liquid supplied from the anode diffusion layer ionizes at the anode electrode and the resulting ions move to the cathode electrode through the electrolyte membrane; and a cathode diffusion layer wound around the membrane electrode assembly layer to absorb a gas or liquid to chemically react with the ions supplied to the cathode electrode through the electrolyte membrane.

According to the present disclosure, the anode diffusion layer may be wound in a predetermined region of the current collector layer, the predetermined region being positioned between a first side having a relatively small outer diameter and a second side having a relatively large outer diameter. The membrane electrode assembly layer may be wound in an excess range including the entire region of the anode diffusion layer. The cathode diffusion layer may be wound in a predetermined region of the membrane electrode assembly layer, the predetermined region being spaced from both sides of the membrane electrode assembly layer by a predetermined length.

In addition, the electrolyte membrane according to the present disclosure is coated with a catalyst that accelerates the chemical reaction of the gas or liquid supplied from the anode diffusion layer and the cathode diffusion layer.

The fuel cell units according to the present disclosure are connected in series in such a manner that the electrolyte membrane included in the membrane electrode assembly layer of one of the fuel cell units is bonded to the electrolyte membrane included in the membrane electrode assembly layer of another fuel cell unit by thermal curing.

The fuel cell stack according to the present disclosure may further include an end current collector layer that is wound around the cathode diffusion layer of the last fuel cell unit and which is connected to an external device.

In addition, according to the present disclosure, the current collector layer and the end current collector layer may have a mesh shape.

In addition, according to the present disclosure, the anode diffusion layer and the cathode diffusion layer may be formed of a bendable grid-type carbon fiber film.

The fuel cell stack according to the present disclosure may further include a connection unit disposed at one end of the fuel cell stack and configured to bendably connect the fuel cell stack to an adjacent fuel cell stack.

The connection unit according to the present disclosure may be formed of a bendable corrugated tube.

According to the present disclosure, the connection unit may connect the two fuel cell stacks to each other in a manner that a relatively small outer diameter portion of the connection unit is inserted into a relatively large outer diameter portion of one of the two fuel cell stacks, and a relatively small outer diameter portion of the remaining fuel cell stack of the two fuel cell stacks is inserted into a relatively large outer diameter portion of the connection unit.

In addition, according to the present disclosure, the current collector layer of the fuel cell stack into which the relatively small outer diameter portion of the connection unit is inserted may have the same shape as the corrugated tube of the connection unit.

The electrolyte membrane included in the membrane electrode assembly layer of the connection unit according to the present disclosure may be bonded to the electrolyte membrane included in the membrane electrode assembly layer of a neighboring fuel cell unit by thermal curing.

The tubular polymer electrolyte membrane fuel cell stack according to one embodiment of the present disclosure can be easily stacked because each unit has a truncated cone shape. In addition, since this fuel cell stack includes a reduced number of components and uses components that are changed in design compared to existing fuel cell stacks, a small and lightweight fuel cell stack can be manufactured. In addition, since the corrugated tube is bendable, the volume of the fuel cell stack can be reduced. The described structure can be applied to an electrochemical energy storage and conversion apparatus having a similar structure to a fuel cell as well as a fuel cell. The fuel cell unit can be supplied not only with gaseous fuel but also with liquid fuel. In addition, the truncated cone-shaped structure using a polymer electrolyte membrane, the structure of the bendable connection unit, and the tubular stack structure may be used for water electrolysis and $CO_2$ conversion as well as for fuel cells.

The effects, features, and objectives of the present disclosure are not limited to the ones mentioned above, and other effects, features, and objectives not mentioned above can be clearly understood by those skilled in the art from the following description.

DETAILED DESCRIPTION

Figure 1:
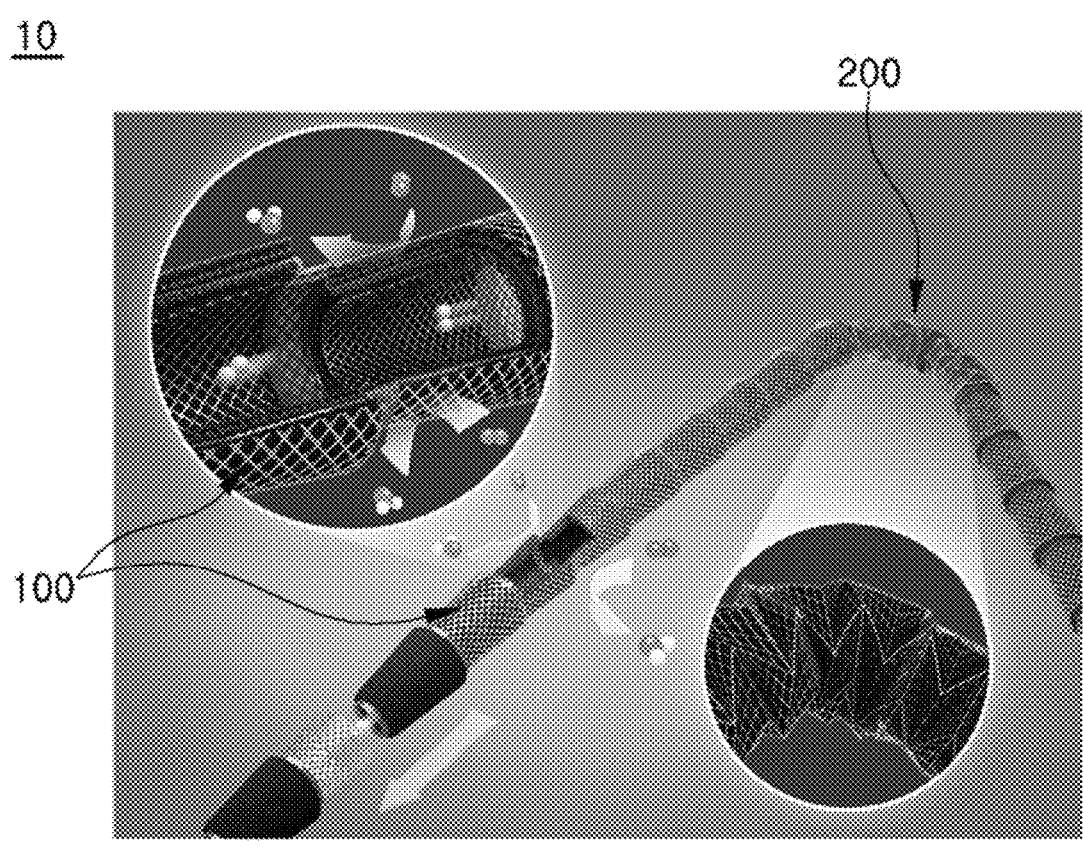
FIG. 1 is a schematic view illustrating the construction of a tubular polymer electrolyte membrane fuel cell stack according to an embodiment of the present disclosure.

Of the components of a fuel cell, the end plate and the bipolar plate account for 60% to 80% of the total weight of the fuel cell and for more than 80% of the total volume of the fuel cell. The end plate serves as a support to transfer clamp pressure and the rigidity and thickness are important factors, limiting the reduction in volume and weight to transfer uniform pressure to the MEA surface. The bipolar plate serves as passageways for each of the gases and reactants supplied to the anode and the cathode, and there is a limit to reduction in the weight of the bipolar plate. Therefore, flexible and lightweight fuel cells can be obtained by reducing the number of cell components and changing the shapes of the cell components through an approach in an aspect of material or design. When design changes are made, clamps for securely holding each component may be required or there may be a problem in that it is difficult to form a stack.

Hereinafter, preferred embodiments of the present disclosure will be described in detail with reference to the accompanying drawings, so that those skilled in the art can easily practice the present disclosure.

In describing exemplary embodiments, description of technical details that are well known in the art and are not directly related to the present disclosure will be omitted. This is to more clearly convey the gist of the present disclosure by omitting unnecessary description.

Further, some components are not illustrated, are schematically illustrated, or are illustrated in an exaggerated manner in the accompanying drawings. In addition, the size of each component does not fully reflect the actual size.

Throughout the drawings, the same or corresponding elements are assigned the same reference numerals.

FIG. 1 is a schematic view illustrating the construction of a tubular polymer electrolyte membrane fuel cell stack according to one embodiment of the present disclosure.

Referring to FIG. 1, a tubular polymer electrolyte membrane fuel cell stack 10 according to one embodiment of the present disclosure includes a plurality of fuel cell units 100 formed in a truncated cone shape and connected in series with each other. The fuel cell units 100 are connected in series with each other in a manner that a first end with a relatively smaller outer diameter of one fuel cell unit 100 is inserted into a second end with a relatively larger diameter of the next fuel cell unit 100.

The fuel cell stack 10 is configured such that fuel can be supplied to the inside of the fuel cell stack 10. Therefore, it is not necessary that a separate fuel supply line for the supply of fuel is added.

The fuel cell unit 100 has a truncated cone shape, so that it is not necessary to use separate clamps to couple each fuel cell unit 100 to a neighboring truncated cone-shaped fuel cell unit 100. Therefore, the fuel cell stack 10 can be manufactured to be lightweight.

According to one embodiment of the present disclosure, the fuel cell stack 10 can be supplied with liquid fuel as well as gas fuel.

Figure 2:
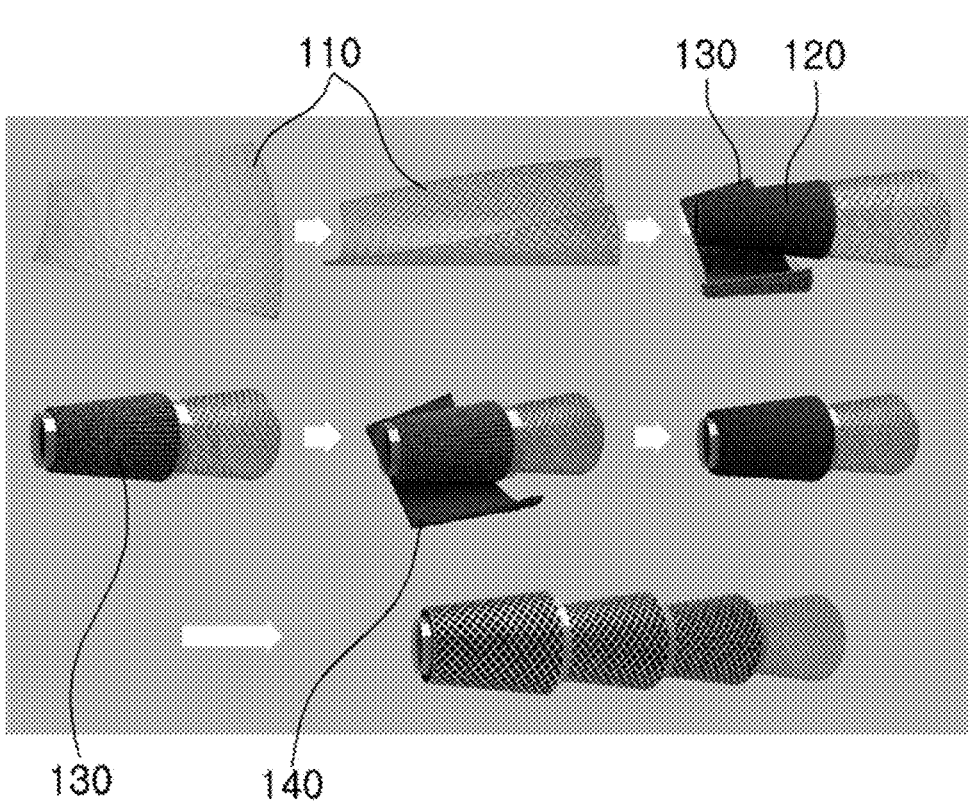
FIG. 2 is a schematic view illustrating a process of forming a fuel cell unit according to one embodiment of the present disclosure.

FIG. 2 is a schematic view illustrating a process of forming a fuel cell unit according to one embodiment of the present disclosure.

Referring to FIG. 2, the fuel cell unit 100 includes: a truncated cone-shaped current collector layer 110; an anode diffusion layer 120 wound around the current collector layer 110 to absorb a gas or liquid to be supplied to an anode electrode; a membrane electrode assembly layer 130 composed of an electrolyte membrane (not shown), an anode electrode (not shown), and a cathode electrode (not shown), wound around the anode diffusion layer 120, and configured such that a gas or liquid supplied from the anode diffusion layer 120 ionizes at the anode electrode and the resulting ions move the cathode electrode through the electrolyte membrane; and a cathode diffusion layer 140 wound around the membrane electrode assembly layer 130 and configured to absorb a gas or liquid that is to chemically react with the ions supplied to the cathode electrode through the electrolyte membrane.

The anode diffusion layer 120 may be wound over a predetermined region of the current collector layer 110 in a direction from a first end of the current collector layer 110 to a second end of the current collector layer 110, in which the first end has a relatively small outer diameter and the second end has a relatively large outer diameter. The membrane electrode assembly 130 may be wound over an excessive range including the entire region of the anode diffusion layer 120. The cathode diffusion layer 140 may be wound over a predetermined region of the membrane electrode assembly 130, the region being spaced from respective ends of the membrane electrode assembly 130 by a predetermined length.

According to one embodiment of the present disclosure, the excessive range may be a region exceeding the full range of the anode diffusion layer 120 and may be connected to an electrolyte membrane of an membrane electrode assembly layer 130 of a neighboring fuel cell unit 100.

Since the truncated cone-shaped fuel cell unit 100 has a truncated cone-shaped structure so that fuel can be uniformly supplied to the membrane electrode assembly layer 130. Therefore, the fuel cell stack 10 may not be provided with an end plate serving as a support and with a flow field for uniform supply of fuel. Since the end plate and the flow field are not provided, the volume and weight of the fuel cell stack 10 can be reduced.

According to one embodiment of the present disclosure, the electrolyte membrane may be coated with a catalyst that accelerates a chemical reaction of gas or liquid supplied from the anode diffusion layer and the cathode diffusion layer. In the membrane electrode assembly layer 130 according to one embodiment of the present disclosure, the electrolyte membrane may be a Nafion membrane. Specifically, a Nafion 211 membrane or a Nafion 212 membrane may be used as the electrolyte membrane.

According to one embodiment of the present disclosure, 40% by weight of a Pt/C catalyst may be used as anode and cathode catalysts (not shown). The catalyst slurry may be prepared by sonication of isopropyl alcohol, non-electrolyzed water, 5% by weight of a Nafion ionomer solution, and a catalyst. The catalyst slurry may be applied on both sides of the Nafion electrolyte membrane by a spray coating method. The applied catalyst may be dried at room temperature for 24 or more hours. The density of the catalyst applied to both sides of the electrolyte membrane may be adjusted to 0.3 mgPt/cm$^2$.

According to one embodiment of the present disclosure, the current collector layer 110 may be cut into a fan shape. The fan-shaped current collector layer 110 may be rounded and welded to form a truncated cone shape.

Next, the anode diffusion layer 120 and the catalyst-coated membrane electrode assembly layer 130 may be wound around the truncated cone-shaped current collector layer 110. The components are heated to 180° C. so that the electrolyte membrane may be bonded. Next, the cathode diffusion layer 140 may be formed.

Figure 3:
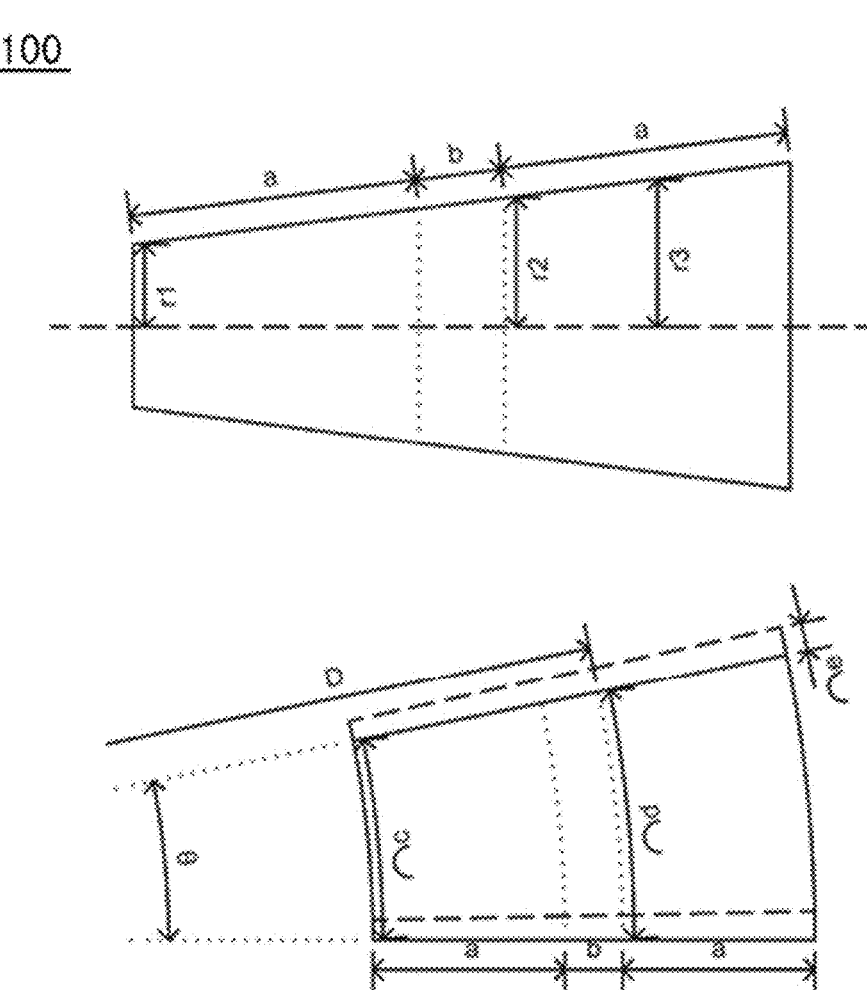
FIG. 3 is a schematic view illustrating the shape of a fuel cell unit according to one embodiment of the present disclosure.

FIG. 3 is a schematic view illustrating the shape of a fuel cell unit according to one embodiment of the present disclosure.

Referring to FIG. 3, an upper figure is a side view of the fuel cell unit 100. A lower figure is a development view of the fuel cell unit 100 that is unfolded. The fuel cell unit 100 has a fan shape in the unfolded state.

Dimensions of each component of the fuel cell unit 100 may be derived by formula shown below.

$$r_1 = \frac{\frown c}{2\pi}$$

$$\frown d = 2\pi r_2$$

$$r_2 = r_1 + 2t_{GDL} + t_{membrane} + 2t_{metal}$$

$$D = \frown d \times \frac{a+b}{\frown d - \frown c}$$

$$\theta = \frac{\frown d}{2\pi D} \times 360°$$

Here, $r_1$ is the radius of a narrow end portion of a truncated cone, $r_2$ is the radius of an inserted portion of the lower end portion of the truncated cone, $I_{GDL}$ is the thickness of the anode diffusion layer 120 or the thickness of the cathode diffusion layer 140, $t_{membrane}$ is the thickness of an membrane electrode assembly layer 130, $f_{metal}$ is the thickness of a first aggregate layer 110, a is the length of electrodes, b is the spacing between the electrodes, $\frown c$ is an arc length of the narrow end portion of the truncated cone, $\frown d$ is an arc length of the inserted portion of the narrow end portion of the truncated cone, $\frown e$ is an arc length of a bonded portion, D is the radius of a sector ranging to the inserted portion of the narrow end portion of the truncated cone, and θ is the central angle of the sector.

Here, $r_1$, $r_2$, d, and D are defined by a, b, and c. A narrow-side electrode length and a wide-side electrode length a may be 10 mm. The spacing b between the narrow-side electrode and the wide-side electrode may be 3 mm. The spacing may be a portion for bonding the electrolyte membranes included in the respective fuel cell units when the fuel cell units are stacked. The narrow-side arc length $\frown C$ may be 10 mm. The arc length $\frown e$ of a portion bonded to form the truncated cone-shaped fuel cell unit 100 may be 1.5 mm.

According to one embodiment of the present disclosure, the gap reserved for the anode diffusion layer 120 and the cathode diffusion layer 140 and positioned between the current collector layer 110 of one fuel cell unit 100 and the current collector layer 110 of a neighboring fuel cell unit 100 may be set to be smaller than the initial thickness of the anode and cathode diffusion layers 120 and 140 so that the contact resistance between the current collector layer 110 of one fuel cell unit 100 and the current collector layer 110 of the neighboring fuel cell unit 100 can be reduced.

Figure 4:
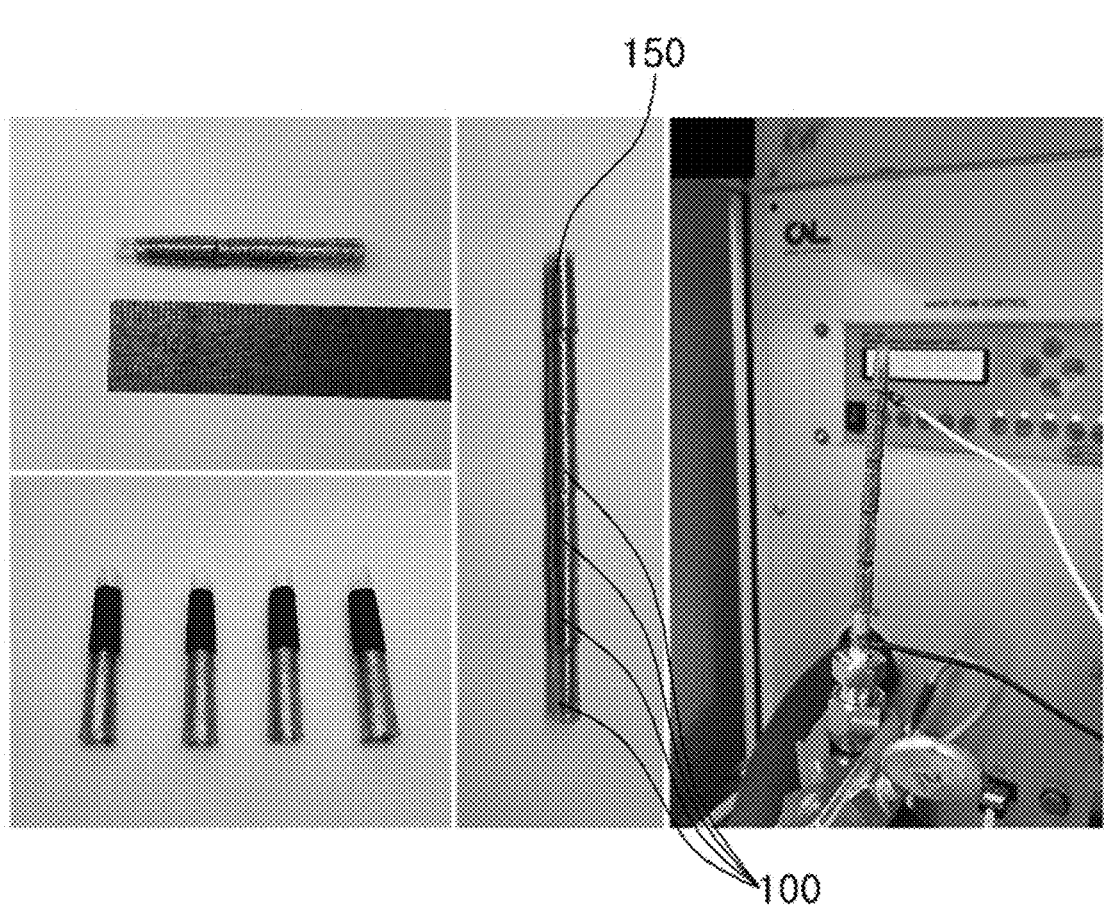
FIG. 4 is a diagram illustrating the shape of a fuel cell stack according to one embodiment of the present disclosure.

FIG. 4 is a diagram illustrating the shape of a fuel cell stack according to one embodiment of the present disclosure.

Referring to FIG. 4, the electrolyte membrane included in the membrane electrode assembly layer 130 of one fuel cell unit 100 is coupled to the electrolyte membrane included in the membrane electrode assembly layer 130 of another fuel cell unit 100 by thermal curing, so that the fuel cell units 100 are connected in series. Specifically, a seal is provided in a manner that the electrolyte membranes may be heated to 180° C. so that the electrolyte membrane in one fuel cell unit 100 can be bonded to the electrolyte membrane in another fuel cell unit 100. Thus, fuel leakage is prevented.

According to one embodiment of the present disclosure, the fuel cell stack 10 may further include an end current collector layer 150 that is wound around the cathode diffusion layer 140 of the last fuel cell unit 100 and which is connected to an external device. Referring to FIG. 3, the end current collector layer 150 may have a length equal to the length a of the wide-side electrode.

According to one embodiment of the present disclosure, each of the fuel cell units 100 has a length of 23 mm and a weight of 0.125 g. When the two fuel cell units 100 are connected, the length becomes 36 mm and the weight becomes 0.22 g. When two fuel cell units 100 are connected to form one fuel cell stack 10, the length of the fuel cell stack 10 is increased by 13 mm and the weight of the fuel cell stack 10 is increased by 0.095 g.

Figure 5:
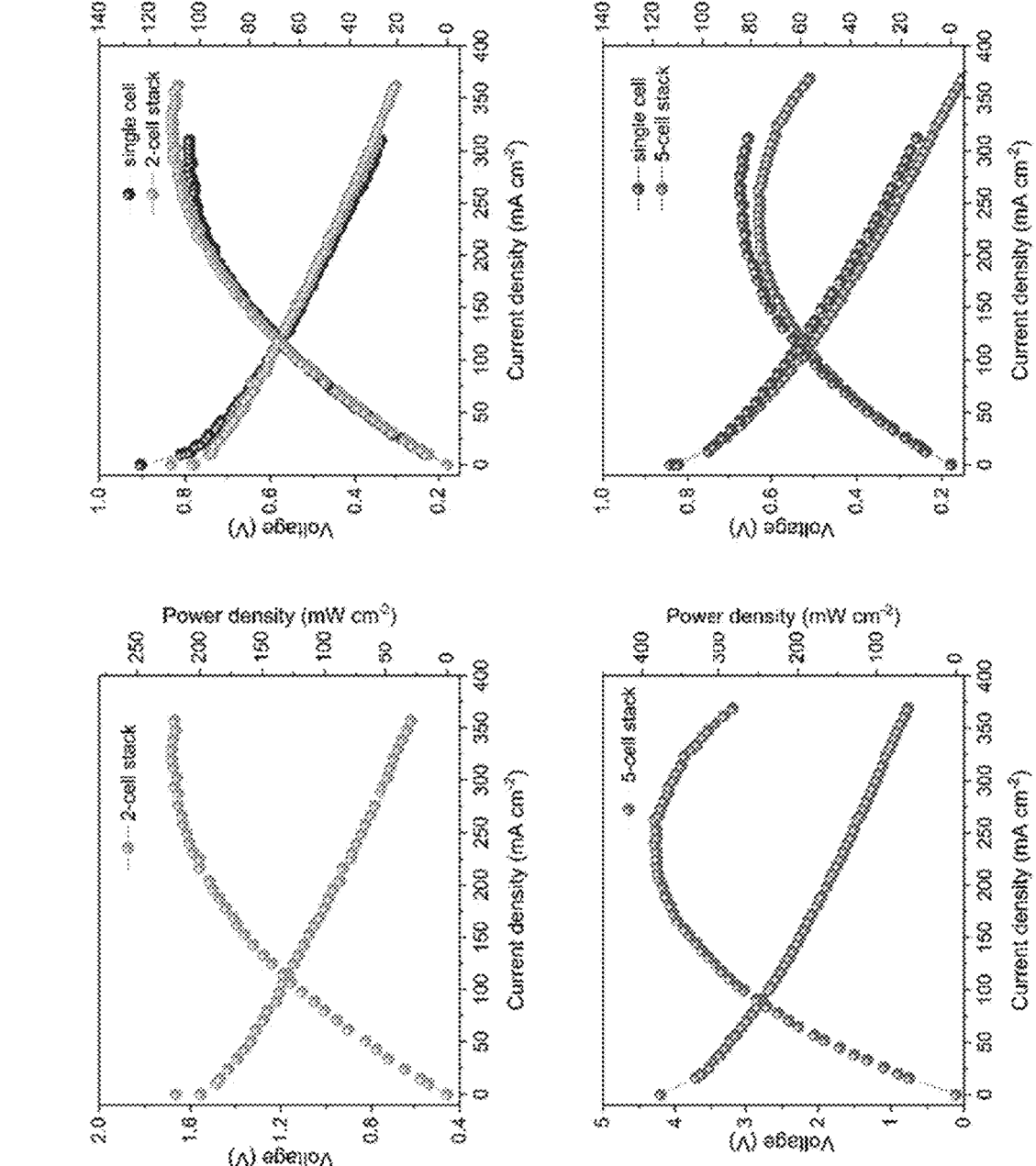
FIG. 5 shows a comparison of output values before and after fuel cell units according to one embodiment of the present disclosure are connected.

FIG. 5 shows a comparison of output values before and after fuel cell units according to one embodiment of the present disclosure are connected.

Referring to FIG. 5, a fuel cell stack 10 in which two fuel cell units 100 are connected and a fuel cell stack 10 in which five fuel cell units 100 are connected do not exhibit a significant difference in output value per unit volume. Therefore, when the fuel cell stack 10 is formed by connecting a plurality of fuel cell units 100, the output value per unit volume of the fuel cell stack 10 is greater than the sum of the output values of an equal number of individual fuel cell units 100.

Figure 6:
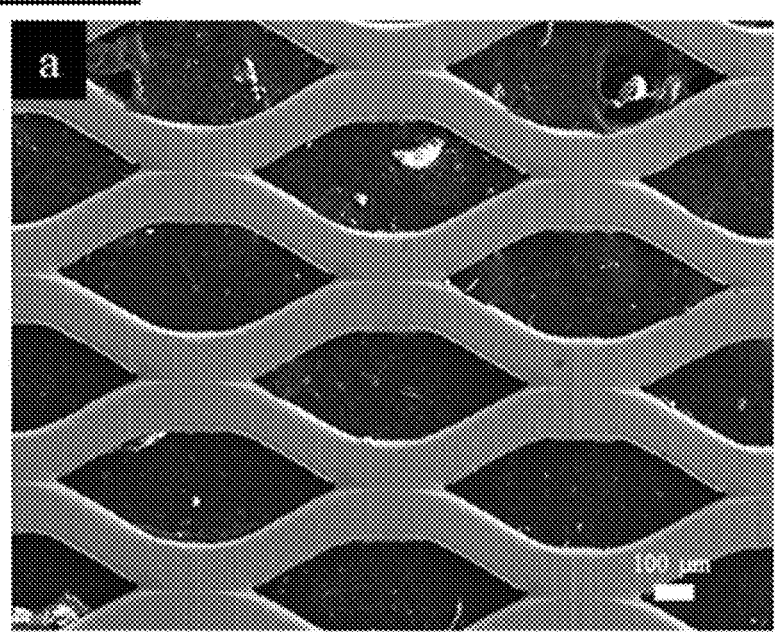
FIG. 6 is a view illustrating the shapes of first and second aggregate layers according to one embodiment of the present disclosure.

FIG. 6 is a view illustrating the shapes of first and second aggregate layers according to one embodiment of the present disclosure.

Referring to FIG. 6, the current collector layer 110 has a mesh shape.

According to one embodiment of the present disclosure, the current collector layer 110 is made of stainless steel.

According to one embodiment of the present disclosure, the current collector layer 110 and the end current collector layer 150 are made of stainless steel. The current collector layer 110 and the end current collector layer 150 may have a thickness of 50 μm and an open area ratio of 52%. The thickest grid line of the current collector layer 110 and the end current collector layer 150 may have a width of 110 μm and a surface resistance of 61.94 m/sq.

Figure 7:
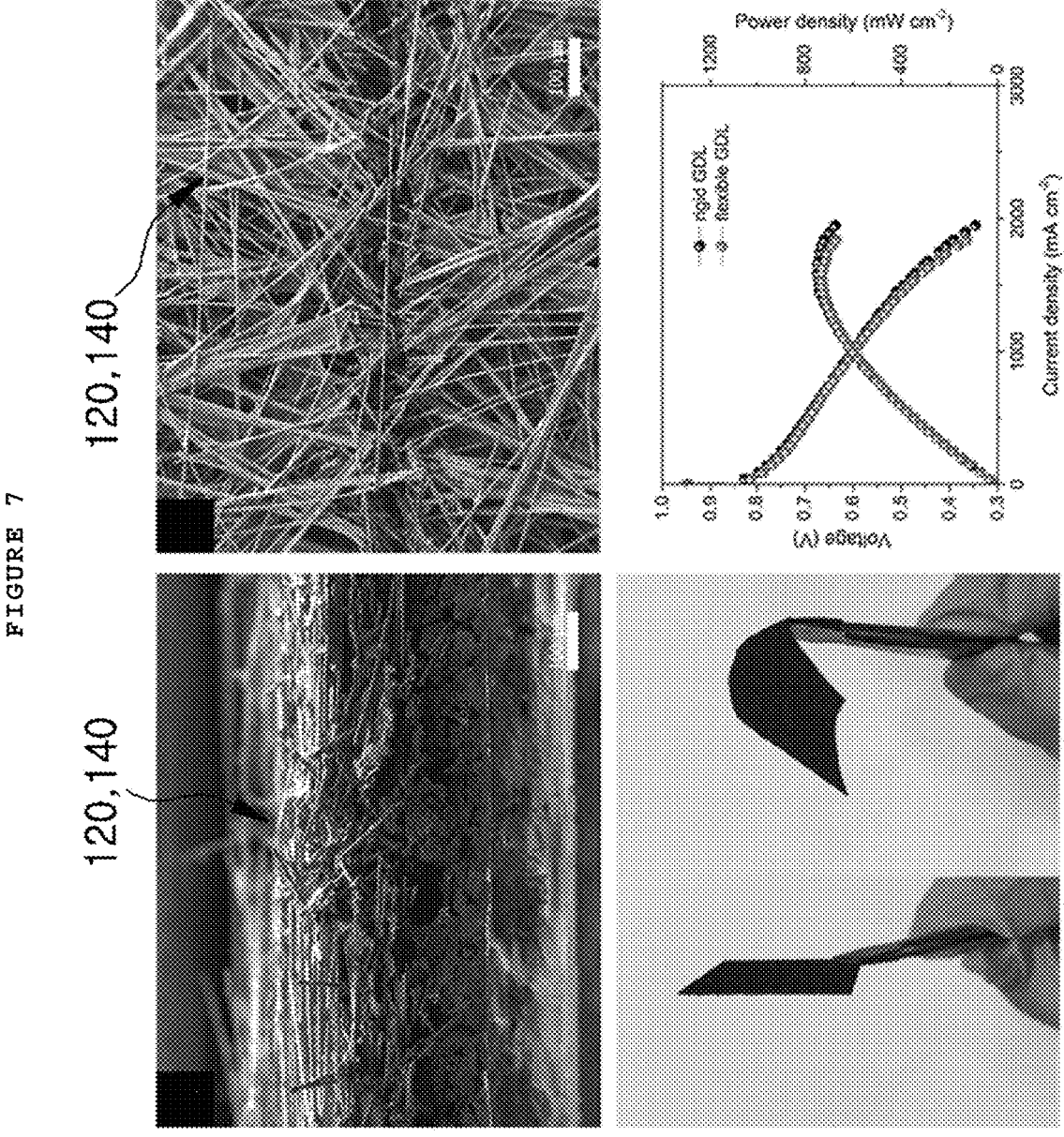
FIG. 7 illustrates shapes of anode and cathode diffusion layers according to one embodiment of the present disclosure and a comparison of output values of rigid and flexible diffusion layers according to one embodiment of the present disclosure.

FIG. 7 illustrates shapes of anode and cathode diffusion layers according to one embodiment of the present disclosure and a comparison of output values of rigid and flexible diffusion layers according to one embodiment of the present disclosure.

Referring to FIG. 7, the anode diffusion layer 120 and the cathode diffusion layer 140 are in the form of a bendable grid-type carbon fiber film.

According to one embodiment of the present disclosure, each of the anode diffusion layer 120 and the cathode diffusion layer 140 includes a microporous layer and a carbon paper layer. Each of the anode diffusion layer 120 and the cathode diffusion layer 140 has an overall thickness of 210 μm. Since the carbon fiber film included in the carbon paper layer is formed in a grid form by a plotter printer at regular intervals, the anode diffusion layer 120 and the cassette diffusion layer 140 become flexible. As a result of the comparison between the rigid diffusion layer and the flexible diffusion layer, there is no significant difference in the output values of the fuel cells.

Figure 8:
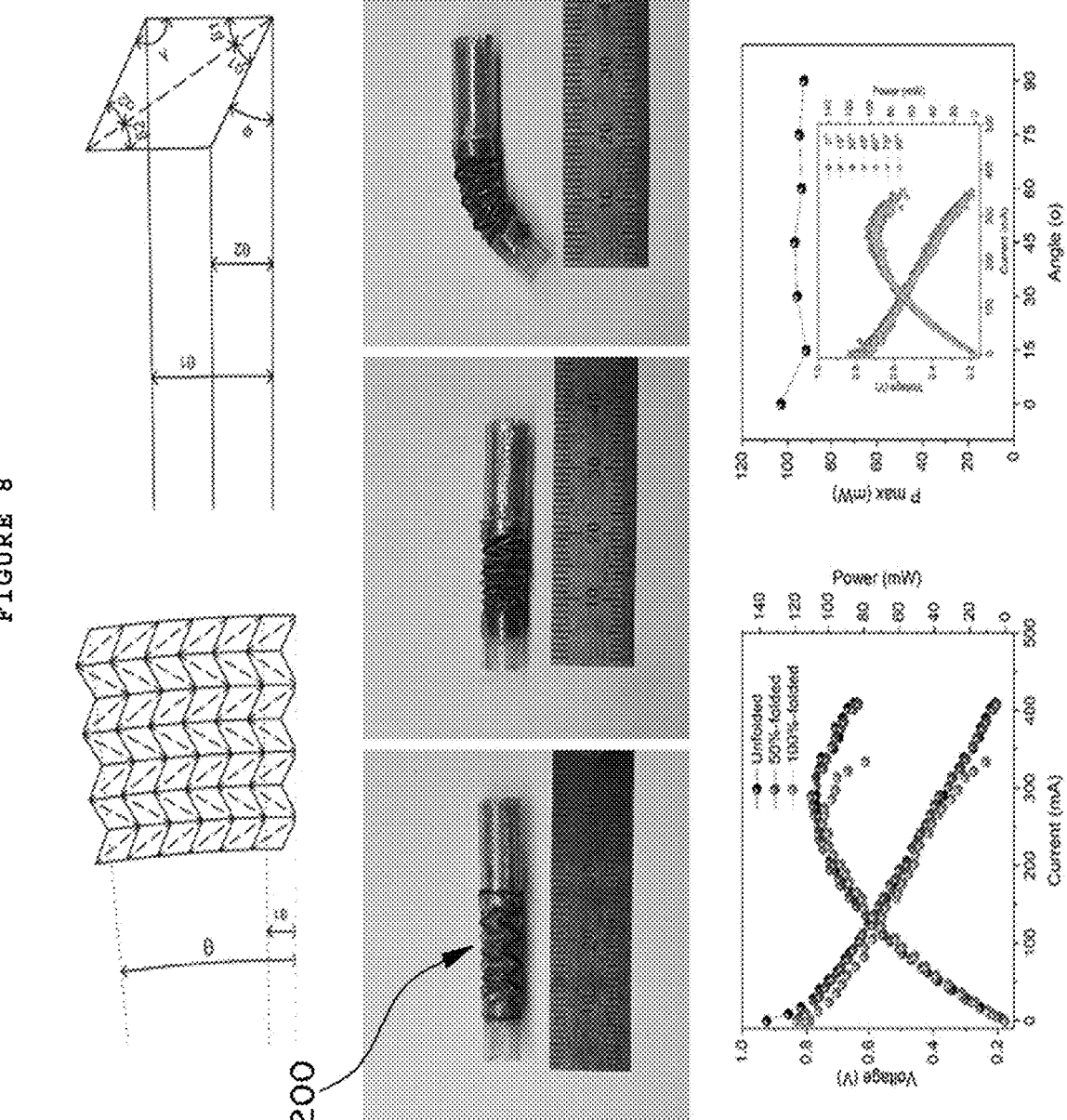
FIG. 8 illustrates changes in output values according to a shape of a connection unit and a bending degree of the connection unit, according to one embodiment of the present disclosure.

FIG. 8 illustrates changes in output values according to a shape of a connection unit and a bending degree of the connection unit, according to one embodiment of the present disclosure.

Referring to FIG. 8, according to one embodiment of the present disclosure, the fuel cell stack 10 may further include a connection unit 200 provided at a first end thereof. The connection unit 200 bendably connects the fuel cell stack 10 to a neighboring the fuel cell stack 10.

The connection unit 200 may be formed of a bendable corrugated tube. According to one embodiment of the present disclosure, the connection unit 200 may have a corrugated tube shape composed of ridges and grooves. A plurality of triangular shapes abuts each other at border lines to be foldable to form "ridges" and "grooves". In the figure, solid lines indicate "ridges" and dotted lines indicate "grooves". The portions other than the "ridges" and the "grooves" may remain planar. According to one embodiment of the present disclosure, the shape of a triangle may be defined by the following formula:

$$\alpha = \frac{2\pi - \theta}{2N}$$

$$\theta_1 = \frac{\theta}{N}$$

$$\varphi + \alpha_1 + \beta_1 + \frac{\theta_1}{2} = \frac{\pi}{2}$$

$$\varphi + \beta_1 = \frac{\pi}{2} - \frac{\pi}{N}$$

-continued
$$r = (\pi - (\alpha_1 + \beta_1 + \varphi) - \theta_1) + \varphi = \pi - \alpha_1 - \beta_1 - \theta_1$$

$$\gamma = \pi - \alpha_2 - \beta_1$$

$$\alpha_2 - \alpha_1 = \theta_1$$

$$\beta_1 - \beta_2 = \theta_2$$

Here, N is the number of units arranged in an arc direction, $\theta$ is the central angle of an overall sector of a connection unit, $\theta_1$ is the central angle of a sector ranging to a far vertex of one unit, $\theta_2$ is the central angle of a sector ranging to a near vertex of one unit, $\varphi$ is an angle from the radius line of the sector to the unit, $\gamma$ is an angle between the longitudinal centerline ("groove" line) of a unit and the facing vertex, $\alpha_1$ is an angle between a line ("ridge" line) of the unit that defines an angle from the radius line of the sector and the longitudinal centerline ("groove" line) of the unit, $\alpha_2$ is an alternate angle in the unit, $\beta_1$ is an angle between a line ("ridge" line) of a unit adjacent to $\alpha_1$ among the lines ("ridge" lines) of the unit forming $\gamma$ and the longitudinal centerline ("groove" line) of the unit, and $\beta_2$ is an alternate angle of $\beta_1$ in the unit.

It can be seen that the structure of the connection unit 200 is associated with the number N of units arranged in an arc direction and with the angle $\beta_1$ between the longitudinal centerline ("groove" line) of a unit and a line ("ridge" line) of the unit adjacent to $\alpha_1$ among the lines ("ridge" lines) of the unit forming $\gamma$. According to one embodiment of the present disclosure, the number of units N in the arc direction may be six. The perimeter of the anode electrode may be 20 mm. The angle $\beta_1$ between the longitudinal centerline ("groove" line) of a unit and the line ("ridge" line) of the unit adjacent to among the lines ("ridge" lines) of the unit forming $\gamma$ may be 30° C. The angle 1 between the longitudinal center line ("groove" line) of a unit and the line ("ridge" line) of a unit forming an angle of $\varphi$ from the radius line of a sector may be 29.46°.

According to one embodiment of the present disclosure, the structure of the connection unit 200 is the same as that of the fuel cell unit 100. A corrugated tube may be formed in a predetermined region of the current collector layer 110, of the entire region ranging from a first side having a relatively small outer diameter to a second side having a relatively large outer diameter, of the current collector layer 110 of the connection unit 200. The anode diffusion layer 120 may be wound in the form of a corrugated tube shape within a predetermined region of the corrugated tube-shaped region of the current collector layer 110. The membrane electrode assembly layer 130 may be wound in the form of a corrugated tube shape in an excessive range including the entire region of the anode diffusion layer 120. The cathode diffusion layer 140 may be wound in the form of a corrugated tube shape within a predetermined region of the membrane electrode assembly layer 130, in which the predetermined region is positioned to be spaced from both sides of the membrane electrode assembly layer 130.

According to one embodiment of the present disclosure, two fuel cell stacks 10 are connected in a manner that a first end of both ends of the connection unit 200 is inserted into a second end of both ends of one fuel cell stack 10, and a first end of both ends of another fuel cell stack 10 is inserted into a second end of the connection unit, in which the first end of the connection unit 200 has a relatively small outer diameter compared to the second end thereof, and the first end of each fuel cell stack 10 has a relatively small outer diameter compared to the second end thereof.

According to one embodiment of the present disclosure, the current collector layer 110 of the fuel cell stack 10 into which the first end, which has a relatively small outer diameter, of the connection unit 200 is inserted may have the same shape as the corrugated tube shape of the connection unit 200. The connection may be made in such a manner that the electrolyte membrane included in the membrane electrode assembly layer 130 of the connection unit 200 may be bonded to the electrolyte membrane included in the electrode film polymer layer 130 of a neighboring fuel cell unit 100 by thermal curing.

According to one embodiment of the present disclosure, the power generation output of the fuel cell stack 10 decreases by 10% when the connection unit 200 is fully bent (100% folded), i.e., at an angle of 90°. However, in the case the fuel cell stack 10 is applied to an electronic device in a state in which the connection unit 200 is bent an angle of 90°, the fuel cell stack 10 can be applied to an electronic device on which an existing fuel cell stack 10 which is not bendable cannot be mounted due to shape-induced constraints. The number of the fuel cell units 100 can be applied to a small electronic device may be greater in the case where the bendable fuel cell stack 10 is applied than the case where an unbendable fuel cell stack 10 is applied. Therefore, the power generation output of the bendable fuel cell stack 10 applied to a small electronic device may be higher than the power generation output of an unbendable fuel cell stack 10 applied to a small electronic device.

According to one embodiment of the present disclosure, the fuel cell stack 10 can be supplied with liquid fuel as well as gas fuel. When liquid fuel is supplied, a 75 wt. % PtRu/C (Pt 50 wt. %, Ru 25 wt. %) catalyst may be used as an anode catalyst. A 60 wt. % Pt/C catalyst may be used as a cathode catalyst. The density of the catalyst applied as the anode catalyst may be 2 mg PtRu/cm². The density of the catalyst applied as the cathode catalyst may be 1 mg Pt/cm². Nafion 115 may be used as an electrolyte membrane.

The tubular polymer electrolyte membrane fuel cell stack according to one embodiment of the present disclosure can be easily stacked because each unit has a truncated cone shape. In addition, since this fuel cell stack includes a reduced number of components and uses components that are changed in design compared to existing fuel cell stacks, a small and lightweight fuel cell stack can be manufactured. In addition, since the corrugated tube is bendable, the volume of the fuel cell stack can be reduced. The described structure can be applied to an electrochemical energy storage and conversion apparatus having a similar structure to a fuel cell as well as a fuel cell. The fuel cell unit can be supplied not only with gaseous fuel but also with liquid fuel. In addition, the truncated cone-shaped structure using a polymer electrolyte membrane, the structure of the bendable connection unit, and the tubular stack structure may be used for water electrolysis and $CO_2$ conversion as well as for fuel cells.

Although preferred embodiments of the present disclosure have been described in the present specification and the drawings, the embodiments are merely disclosed in a general sense only to facilitate understanding of the present disclosure and are not intended to limit the scope of the present disclosure. It is apparent to those skilled in the art that aside from the embodiments disclosed herein, other modifications based on the technical idea of the present disclosure can be made.

According to the present disclosure, truncated cone-shaped fuel cell units are used. Therefore, the fuel cell units can be easily stacked. In addition, the number of components of a fuel cell stack is reduced, and the components of a fuel cell stack are improved. For this reason, it is possible to produce a small and lightweight fuel cell stack. The present disclosure also can be applied to electrochemical energy storage and conversion devices having a similar structure to a fuel cell stack.

What is claimed is:

1. A fuel cell stack with a tubular polymer electrolyte membrane, the fuel cell stack comprising:

a plurality of fuel cell units having a truncated cone shape and connected in series, the plurality of fuel cell units comprising at least a first fuel cell unit and a second fuel cell unit adjacent to each other, wherein a relatively small outer diameter portion of the first fuel cell unit is inserted into a relatively large outer diameter portion of the second fuel cell unit, wherein each of the first and second fuel cell units comprises:

a truncated cone-shaped current collector layer, an anode diffusion layer wound around the current collector layer to absorb gas or liquid to be supplied to an anode electrode, a membrane electrode assembly layer wound around the anode diffusion layer, comprising an electrolyte membrane, an anode electrode, and a cathode electrode, and configured such that gas or liquid supplied from the anode diffusion layer ionizes at the anode electrode and the resulting ions move to the cathode electrode through the electrolyte membrane, and a cathode diffusion layer wound around the membrane electrode assembly to absorb gas or liquid that is configured to chemically react with the ions supplied to the cathode electrode through the electrolyte membrane, wherein:

the anode diffusion layer is wound within a predetermined region of the current collector layer, the predetermined region being positioned in a range from a first side having a relatively small outer diameter to a second side having a relatively large outer diameter, of both sides of the current collector layer, the membrane electrode assembly layer is wound over an extended range that includes the entire region of the anode diffusion layer, the cathode diffusion layer is wound within a predetermined region of the membrane electrode assembly layer, the predetermined region spaced from both sides of the membrane electrode assembly layer, the anode diffusion layer is wound around an upper portion of the second fuel cell unit having a smaller diameter than a lower portion of the second fuel cell unit, the cathode diffusion layer is wound over and covers the anode diffusion layer, the cathode diffusion layer along with the upper portion of the second fuel cell unit covered by the cathode diffusion layer is inserted into the first fuel cell unit such that the anode and cathode diffusion layers of the second fuel cell unit are radially compressed in the assembled state, the resulting gap between the current collector layers of the first and second fuel cell units being smaller than the combined uncompressed thicknesses of the anode and cathode diffusion layers of the second fuel cell unit, so as to reduce electrical contact resistance between the current collector layers of the first and second fuel cell units, and no separate clamping member or end plate is used to maintain the compression or electrical contact.

2. The fuel cell stack of claim 1, wherein the electrolyte membrane is coated with a catalyst that accelerates a chemical reaction of gas or liquid supplied from the anode diffusion layer and gas or liquid supplied from the cathode diffusion layer.

3. The fuel cell stack of claim 1, wherein the fuel cell stack further comprises an end current collector layer wound around the cathode diffusion layer of the last fuel cell unit and connected to an external device.

4. The fuel cell stack of claim 3, wherein the current collector layer and the end current collector layer have a mesh shape.

5. The fuel cell stack of claim 4, wherein the anode diffusion layer and the cathode diffusion layer comprise a bendable grid-type carbon fiber film.

6. The fuel cell stack of claim 5, wherein the fuel cell stack further comprises a connection unit disposed at one end of the fuel cell stack and configured to bendably connect the fuel cell stack to a second fuel cell stack adjacent to the fuel cell stack.

7. The fuel cell stack of claim 6, wherein the connection unit comprises a bendable corrugated tube.

8. The fuel cell stack of claim 7, wherein the connection unit connects the fuel cell stack and the second fuel cell stack in a manner that a relatively small outer diameter portion of the connection unit is inserted into a relatively large outer diameter portion of the fuel cell stack, and a relatively small outer diameter portion of the second fuel cell stack is inserted into a relatively large outer diameter portion of the connection unit.

9. The fuel cell stack of claim 8, wherein the current collector layer has the same shape as the corrugated tube of the connection unit.

* * * * *